(12) United States Patent
Lumish et al.

(10) Patent No.: US 6,466,341 B1
(45) Date of Patent: Oct. 15, 2002

(54) ADD/DROP FILTER FOR A MULTI-WAVELENGTH LIGHTWAVE SYSTEM

(75) Inventors: Stan Lumish, Red Bank; Magaly Spector, Holmdel, both of NJ (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/128,618

(22) Filed: Aug. 3, 1998

(51) Int. Cl.$^7$ ................................................ H04J 14/02
(52) U.S. Cl. ...................................... 359/127; 359/117
(58) Field of Search ............................... 359/124, 117, 359/127; 385/16, 9

(56) References Cited

U.S. PATENT DOCUMENTS

| | | | | |
|---|---|---|---|---|
| 5,680,235 A | * | 10/1997 | Johansson | 359/110 |
| 5,771,112 A | * | 6/1998 | Hamel et al. | 359/128 |
| 5,812,709 A | * | 9/1998 | Arai et al. | 385/16 |
| 5,915,051 A | * | 6/1999 | Damask et al. | 385/16 |
| 6,035,080 A | * | 3/2000 | Henry et al. | 385/24 |
| 6,088,141 A | * | 7/2000 | Merli et al. | 359/110 |
| 6,198,556 B1 | * | 3/2001 | Mizrahi | 359/124 |
| 6,201,909 B1 | * | 3/2001 | Kewitsch et al. | 385/37 |
| 6,219,474 B1 | * | 4/2001 | Cai et al. | 385/24 |

* cited by examiner

Primary Examiner—Leslie Pascal

(57) ABSTRACT

A method and apparatus are disclosed for providing optical channel adding/dropping capability within a WDM filter-bypass device. The device comprises an optical filter, an optical switch, and means for receiving a control signal to configure the optical switch. When configured in a filter state, the switch routes the WDM signal through the filter to drop, add or drop and add one or more pre-selected WDM channels. When configured in a bypass state, the WDM signal bypasses the filter. A series of filter-bypass devices may be interconnected to increase the number of optical channels that can be dropped or added.

11 Claims, 5 Drawing Sheets

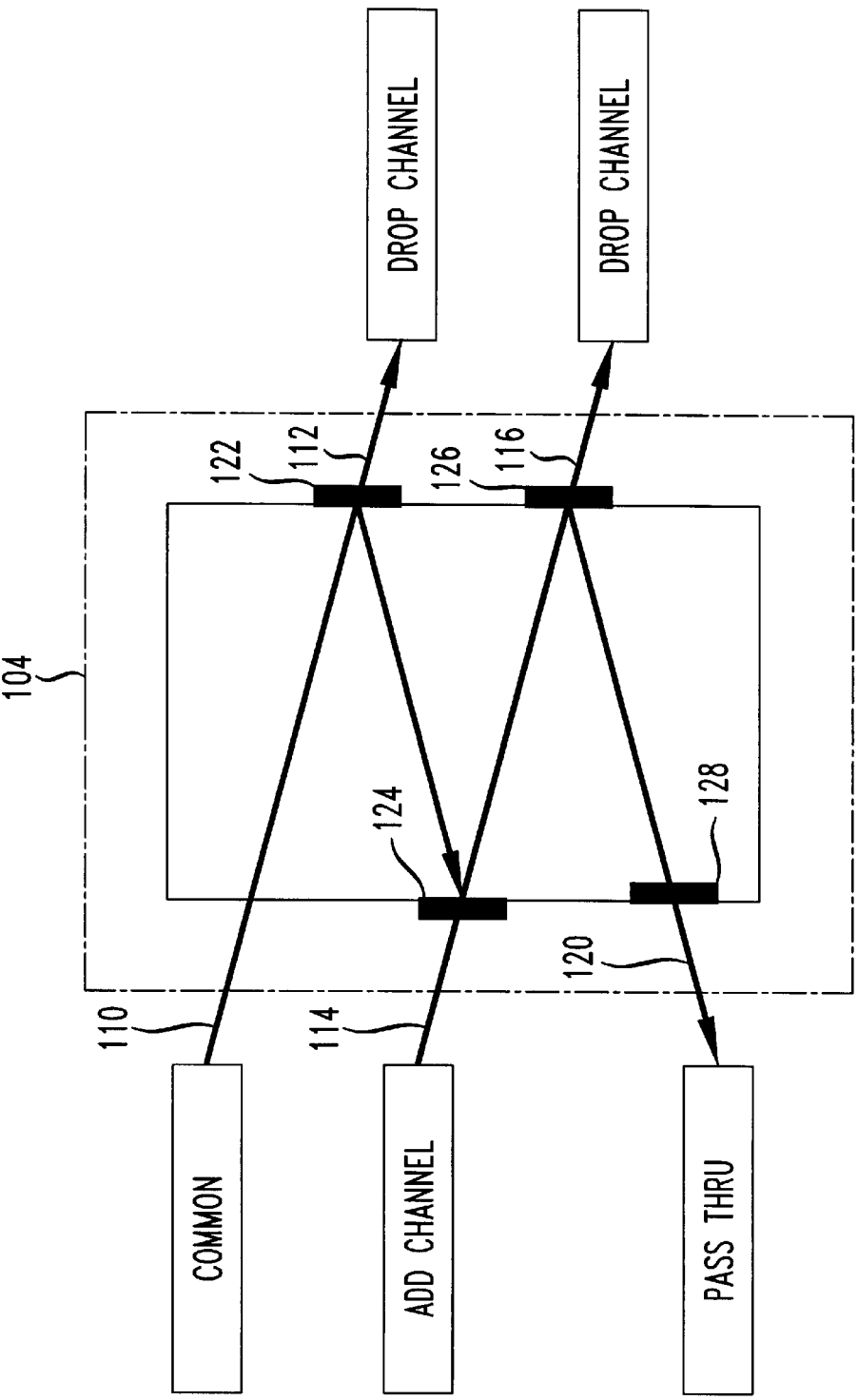

ADD/DROP FILTER FOR A MULTI-WAVELENGTH LIGHTWAVE SYSTEM

FIELD OF THE INVENTION

This invention relates to a configuration of switched optical filters that is used to produce an optical wavelength division multiplexing (WDM) add/drop system.

BACKGROUND OF THE INVENTION

In a long-haul, high capacity wavelength division multiplexing (WDM) optical network, the capability to remove and replace selective WDM channels at multiple add/drop nodes across the network is essential for a variety of value-added communications services including local access, interactive multimedia and wavelength leasing. Specifically, this capability requires dropping one or more optical channels at each add/drop network node from a multiplexed signal composed of a large number of such channels and, in some cases, substituting one or more optical channels that have the same carrier frequencies as the original channels.

WDM add/drop systems have been disclosed in the prior art using a complete frequency demultiplexing approach. Such systems have been constructed by pairing a 1×N channel demultiplexer, such as a so-called Dragone router, with an N×1 passive channel combiner, and operating on a subset of the N channel interconnections between these two devices to remove and replace selective channels (a system of this sort is disclosed in U.S. Pat. No. 5,526,153 issued to Glance on Jun. 11, 1996, hereinafter referred to as the Glance '153 patent). In this configuration, an input signal composed of a plurality of multiplexed optical channels must first be fully demultiplexed to yield a sequence of individual optical channels. Thereafter, a subset of the demultiplexed channels is directed to circuitry where either a drop, add, or a drop and add of one or more of the individual channels can take place. Subsequently, the demultiplexed channels are directed to a multiplexer to produce a new plurality of multiplexed optical channels. Regardless of the number of optical channels to be added, dropped or dropped and added, the entire plurality of multiplexed optical channels must be demultiplexed and multiplexed. Although a large number of channels can be dropped and added using this configuration, it none-the-less presents several significant limitations.

When used in significant number over a long-haul WDM network, these paired demultiplexer/multiplexer add/drop nodes cause a substantial narrowing of the optical channel bandwidths. This narrowing can be further exacerbated by frequency misalignments between laser power sources and optical channel filters occurring, for example, due to temperature effects, polarization sensitivity and aging effects. Because the Dragone router allows some leakage of signals across adjacent channel paths, and introduces signal phase differences among the varying length channel paths, multipath interference is introduced. This interference can cause significant fluctuation in the power distributions of channels delivered through each demultiplexer/multiplexer pair (see, e.g., D. A. Fishman, D. G. Duff, J. A. Nagel, "Measurements and Simulation of Multipath Interference for 1.7-Gb/s Lightwave Transmission Systems Using Single and Multifrequency Lasers," Vol. 8, No. 6 J. of Lightwave Tech., June 1990). Signal power loss across each demultiplexer/multiplexer pair can be substantial, requiring insertion of costly optical amplifiers at an increased number of points in the network.

Channel bandwidth narrowing can be reduced by employing fiber-grating based selective filters that avoid demultiplexing and multiplexing the full set of WDM optical channels (see, e.g., H. Okayama et al., "Dynamic wavelength selective add/drop node comprising fibre gratings and optical switches," Vol. 33, No. 5 of Electronic Letters, pp. 403–404, Feb. 27, 1997). However, insertion losses and costs for these filters can be significant when used to drop and add more than a few channels. And signal dispersion can be problematic in fiber-grating based filter configurations optimized for adjacent channel rejections.

SUMMARY OF THE INVENTION

Cost and insertion loss are significantly reduced over the current art in a filter bypass system that consists of a series of switched filter-bypass devices at each add/drop node. The filters in these filter-bypass devices are individually designed to act upon one or more pre-selected channels in composite WDM signal, and the composite signal is switched to the input of a particular filter only when a corresponding channel is intended to be dropped and/or replaced. Otherwise, the composite signal bypasses the filter to reach subsequent filter-bypass devices in the series. Each device includes a switch capable of assuming several positions for routing the channels, and a filter for extracting (dropping) and inserting (adding) selected channels. Associated with each system is a controller coupled to the switch in each filter-bypass device for the purpose of selecting a desired routing position for that switch.

The inventive system provides several advantages over the prior art. Unnecessary signal processing of optical channels that are not being dropped or added is eliminated, thereby reducing the bandwidth narrowing, noise generation and power losses associated with prior art multiplexer/demultiplexer-based systems. In a preferred embodiment of the invention, the system employs thin-film filter technology to provide a significant improvement over fiber-grating based selective filter systems (see, e.g., H. Okayama et al., "Dynamic wavelength selective add/drop node comprising fibre gratings and optical switches," Vol. 33, No. 5 of Electronic Letters, p.p. 403–404, Feb. 27, 1997) by eliminating the need for optical circulators and by reducing the required number of optical switches. As a result substantial reductions in cost, dispersion and insertion loss are achieved.

BRIEF DESCRIPTION OF THE DRAWING

The invention will be more fully understood from the following detailed description of an illustrative embodiment taken in connection with the appended figures in which:

FIG. 2 shows a schematic diagram of a filter embodiment suitable for use in device embodiments 1a and 1b;

DETAILED DESCRIPTION OF THE INVENTION

Figure 1A:
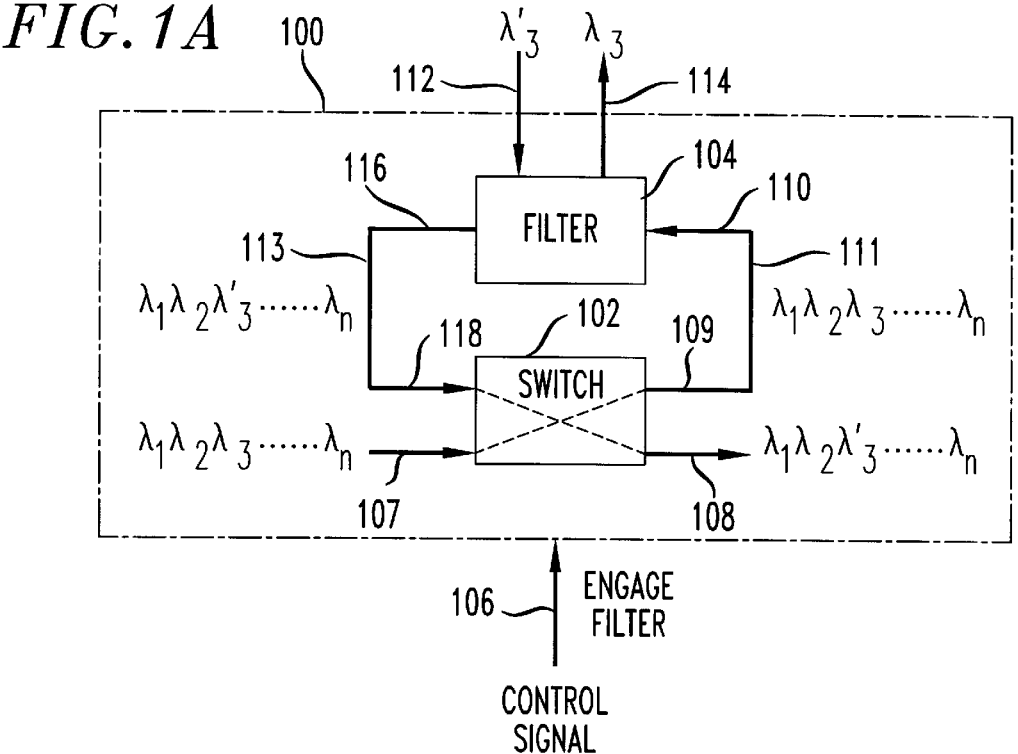
FIG. 1a shows a schematic diagram of an illustrative embodiment of the present invention, with the filter-bypass switch configured to a filter state.

An optical wavelength division multiplexing (WDM) add/drop filter-bypass system provides selective optical channel adding/dropping capability for a multiplexed signal composed of a number of such channels. The filter-bypass system is a structure comprising a series of switched filter-bypass devices. Each device includes an optical switch and an optical filter, and is responsive to a control signal such that an inputted multiplexed optical signal either is routed to or bypasses the optical filter via the optical switch.

In each device, an optical filter is provided having a spectral characteristic related to one or more pre-selected optical channels. This characteristic enables the filter to extract (drop), insert (add), or drop and add each of these pre-selected optical channels to the multiplexed optical signal. If no channels are intended to be filtered, the device causes the multiplexed signal to bypass the filter via the optical switch. Furthermore, this add/drop capability is accomplished without the need to demultiplex the entire multiplexed signal or to pass the signal through non-activated filters as in the prior art. To better explain the advantages provided by this device over the prior art, two prior art WDM add/drop systems are briefly reviewed.

One prior art WDM add/drop system employs a 1×N channel demultiplexer, such as a so-called Dragone router, paired with an N×1 passive channel combiner (see, e.g., the Glance '153 patent). A WDM signal consisting of a plurality of N multiplexed channels is first input to the demultiplexer, which demultiplexes this signal and provides a signal to each of N outputs, each output signal consisting primarily of one of the N channels. The system includes means to selectively drop optical channel signals from each output, and to selectively add optical channel signals to each output. After these signals are dropped and added, each of the outputs are input to the combiner, which multiplexes all of the signals from the outputs to produce a WDM signal consisting of a new plurality of optical channel signals. The optical multiplexers and demultiplexers used in such add/drop systems are further described in U.S. Pat. Nos. 5,002,350 and 5,136,671, issued to Dragone on Mar. 26, 1991 and Aug. 4, 1992, respectively.

In operation, such an arrangement suffers from several deficiencies. In particular, channel bandwidth narrowing and cross-talk can be severe in WDM add/drop applications constructed with many such systems. Multipath interference effects, caused by imperfect channel isolation and phase delays due to differences in individual optical path lengths, produce substantial noise and power penalties (see, e.g., D. A. Fishman, op cit.).

We have discovered that multipath interference can be reduced by employing a filter-based multiplexer in place of the passive coupler currently used in the demultiplexer/multiplexer pair. However, even with this substitution, the limitations associated with channel bandwidth narrowing and power loss remain. Channel narrowing is caused by subjecting the full plurality of channels to many stages of demultiplexing and multiplexing, and from a characteristic frequency misalignment between the laser wavelength signals and the optical filter passbands. This misalignment can occur, for example, from thermal effects, polarization sensitivity and aging. With the bandwidth and signal detection limitations of current systems, channel narrowing effects associated with this arrangement may severely limit the number of useable add/drop nodes in an optical network to no more than about ten nodes. In addition, the filters added to each multiplexer also add a significant cost in multi-node network applications.

A second optical WDM add/drop system reduces the effects of channel narrowing by using a configuration incorporating fiber grating filters, optical circulators and optical switches (see H. Okayama et al., "Dynamic wavelength selective add/drop node comprising fibre gratings and optical switches," Vol. 33, No. 5 of Electronic Letters, pp. 403–404, Feb. 27, 1997). A WDM signal consisting of a plurality of optical channels is directed through an optical circulator to an optical switch, where either it is directed to a fiber grating filter or it bypasses this filter. If directed to the filter, one or more optical channels in the signal are reflected back by the filter and directed to the circulator to be dropped. The remaining channels are directed through a second switch and a second optical circulator. One or more channels may be added to the filter through the second circulator and the second switch, where they are reflected forward into the WDM signal stream. This configuration can be interconnected in a series to provide the capability to drop and add multiple channels in a WDM signal stream.

Although this fiber-grating based add/drop system reduces channel narrowing, it adds significant cost and insertion loss for applications seeking a large number of add/drop channels per node. For example, insertion loss in decibels (dB) may be two to three times greater than for an equivalent add/drop system based on the Dragone multiplexer/demultiplexer pair. In addition, channels at wavelengths below the filtered channel may experience significant transmission losses resulting from cladding mode reflections, thereby limiting the effective use of fiber-grating filters to only a small subset of the WDM channels located at shorter wavelengths (see Turan Erdogan and Victor Mizrahi, "Fiber Grating Technology Grows," IEEE LEOS Newsletter, February 1993, pp. 14–18).

Long-haul optical network add/drop multiplexing of a significant number of 10 add/drop nodes is improved by employing an optical WDM add/drop filter-bypass system consisting of a series of switched optical WDM filter-bypass devices. Based on a unique configuration and use of thin-film filter technology, these filter-bypass systems are able to avoid the bandwidth narrowing effects experienced in the demultiplexer/multiplexer pair configuration. In addition, these systems and are able to eliminate and replace elements used in the fiber-grating based configurations that contribute significant cost and loss. Furthermore, these systems do not experience the effects of cladding mode reflections that limit the range of channels that can be dropped and/or added.

Figure 1B:
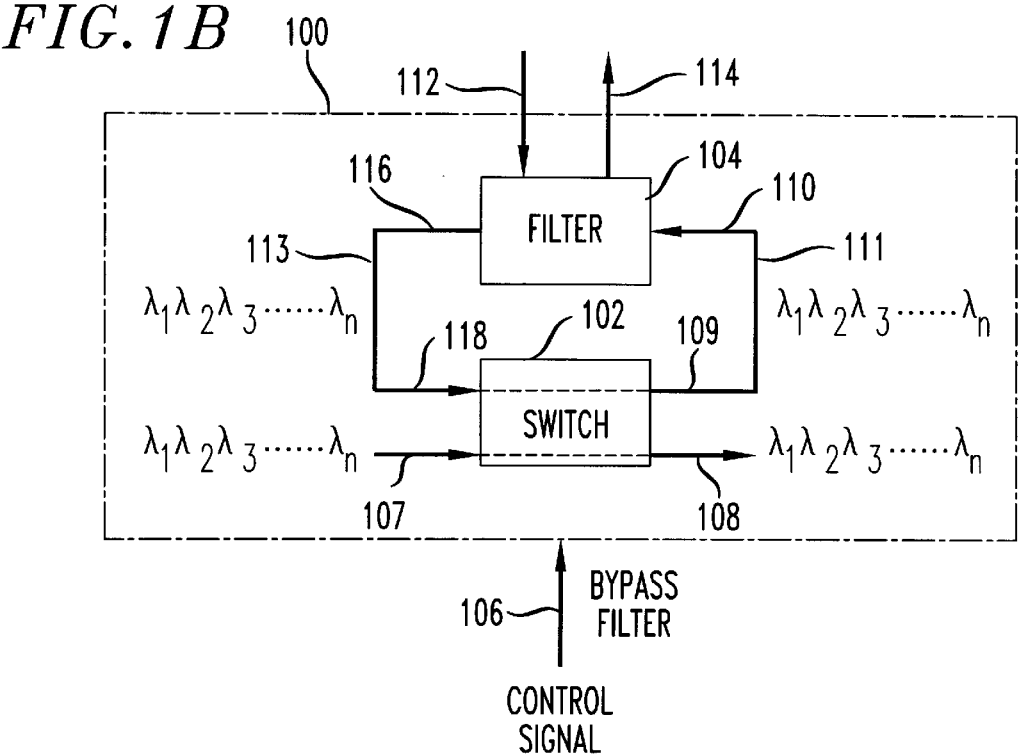
FIG. 1b shows a schematic diagram of the embodiment of FIG. 1a, with the switch in a bypass state.

FIGS. 1(a) and 1(b) show a functional illustration of a filter/bypass device 100 of the type employed in the present invention. Filter/bypass selection is enabled by an optical switch 102. In general, the switch 102 may have N inputs, for receiving optical signals, and M outputs, for transmitting optical signals. For example, the switch 102 shown in FIG. 1(a) has two inputs 107 and 118 and two outputs 108 and 109. Consistent with a series arrangement of interconnected filter-bypass devices (see FIGS. 4(a) and 4(b), the switch 102 can be configured to route the optical signals to a filter state or to a bypass state via a control signal 106). The control signal 106 may be generated by any conventional means including, but not limited to: 1) local control, such as a central office network control operator; 2) remote control, such as a network control center; 3) automated through the use of dynamic network reconfiguration software; or 4) manual control. A 2X2 single-mode fiber-optic switch suitable for this purpose may be obtained from DICon Fiberoptics, Inc. of Berkeley, Calif.

FIG. 1(a), the WDM filter-bypass device 100 comprises the combination of an optical switch 102, an optical filter 104, a control signal 106 and a number of optical inputs and outputs. The switch 102 is configured for operation in the filter state. An optical multiplexed signal $\lambda_1, \lambda_2 \ldots \lambda_n$ is received by the switch input 107. The switch 102, responding to the control signal 106, is switched into a filter state. As a result, the multiplexed signal $\lambda_1 \lambda_2 \ldots \lambda_n$ is switched from the switch input 107 to the switch output 109, which is in turn is coupled to a filter input 110 via an optical link 111, thereby causing the multiplexed signal $\lambda_1 \lambda_2 \ldots \lambda_n$ to be processed by the filter 104. After the filter 104 drops the frequency channel $\lambda_3$ via a filter output 114, and adds frequency channel $\lambda_3$' via a filter input 112, the multiplexed signal $\lambda_1 \lambda_2 \lambda_3' \lambda_n$ is provided to a filter output 116. This output 116 is in turn coupled to the switch input 118 via optical link 113. Thereby, the signal reaches the switch input 118 and is switched by the switch 102 to the output 108.

FIG. 1(b) illustrates operation of the device 100 in the bypass state. An optical multiplexed signal $\lambda_1 \lambda_2 \ldots \lambda_n$ is received by the input 107 of the filter-bypass device 100. In response to the control signal 106, the switch 102 is switched into a bypass state and the multiplexed signal is switched directly to the switch output 108, thereby causing the multiplexed signal $\lambda_1 \lambda_2 \ldots \lambda_n$ to bypass the filter 104. Accordingly, the switch 102 in the bypass state eliminates any unnecessary processing of the multiplexed signal $\lambda_1 \lambda_2 \ldots \lambda_n$.

The filter 104 shown in FIGS. 1(a) and 1(b), may have N inputs, for receiving optical signals, and M outputs, for transmitting optical signals. The active filter elements of the filter 104 can be of the thin-film filter type. In FIG. 2, for example, the filter 104 has two inputs 110 and 114 and three outputs 112, 116 and 120. Thin film filter elements 122, 124, 126 are designed to be effective at respective pre-selected channel frequencies, and are coupled to collimator 128. The filters operate by causing pre-selected frequencies to be transmitted through the filters, and by causing other frequencies to be reflected by these elements. Suitable thin-film filters may be obtained, for example, from Oplink Communications Inc. of Hoboken, N.J., USA as Part No. IBPF-5LT-16-1.

The thin-film filter illustrated in FIG. 2 is configured to drop two selected optical channels and to add one selected optical channel. It will be apparent to those skilled in the art that many other filter combinations are also possible.

Details about the operation and fabrication of such thin-film filters are well known to persons skilled in the art (See M. A. Scobey, D. E. Spock, OCA/Optical Corporation of America, Marlborough, Mass., "Passive DWDM components using MicroPlasma® optical interference filters," OFC '96 Technical Digest pg. 242–243). Thin film filters exploit the interference characteristics of optical waves in order to cause some frequencies in an optical signal to be reflected by the filter elements, and to cause others to be transmitted through the filter elements. Each filter element typically comprises a resonant cavity composed of a multiple number of dielectric thin film layers. Each layer is of a specified thickness (typically equal to one quarter of the optical wavelength to be reflected). Layers of differing thicknesses are stacked in a predetermined order so that a broad range of frequencies may be reflected by each filter element.

In addition to the preferred embodiment of the WDM filter-bypass device illustrated in FIGS. 1(a) and 1(b), there may be many alternative configurations of the WDM filter-bypass device, all of which are contemplated herein. For example, the two by two (2×2) optical switch illustrated in FIGS. 1(a) and 1(b) can be configured such that each filter-bypass device subsequent to the first such device in the filter-bypass series receives as one input the path carrying the bypassed WDM signal for the prior device, and receives as a second input the path carrying the filtered signal from the prior device (see, e.g., FIG. 4(a)). Additionally, for example, the single 2×2 switch used in FIGS. 1(a) and 1(b) can be replaced by a configuration employing two one by two (1×2) switches, two 2×2 switches, or either one 1×2 or one 2×2 switch in combination with a Y-branch wave-guide combiner. As previously noted, the thin film filter may have one or more ports for dropping optical channels and one or more ports for adding optical channels.

Figure 3:
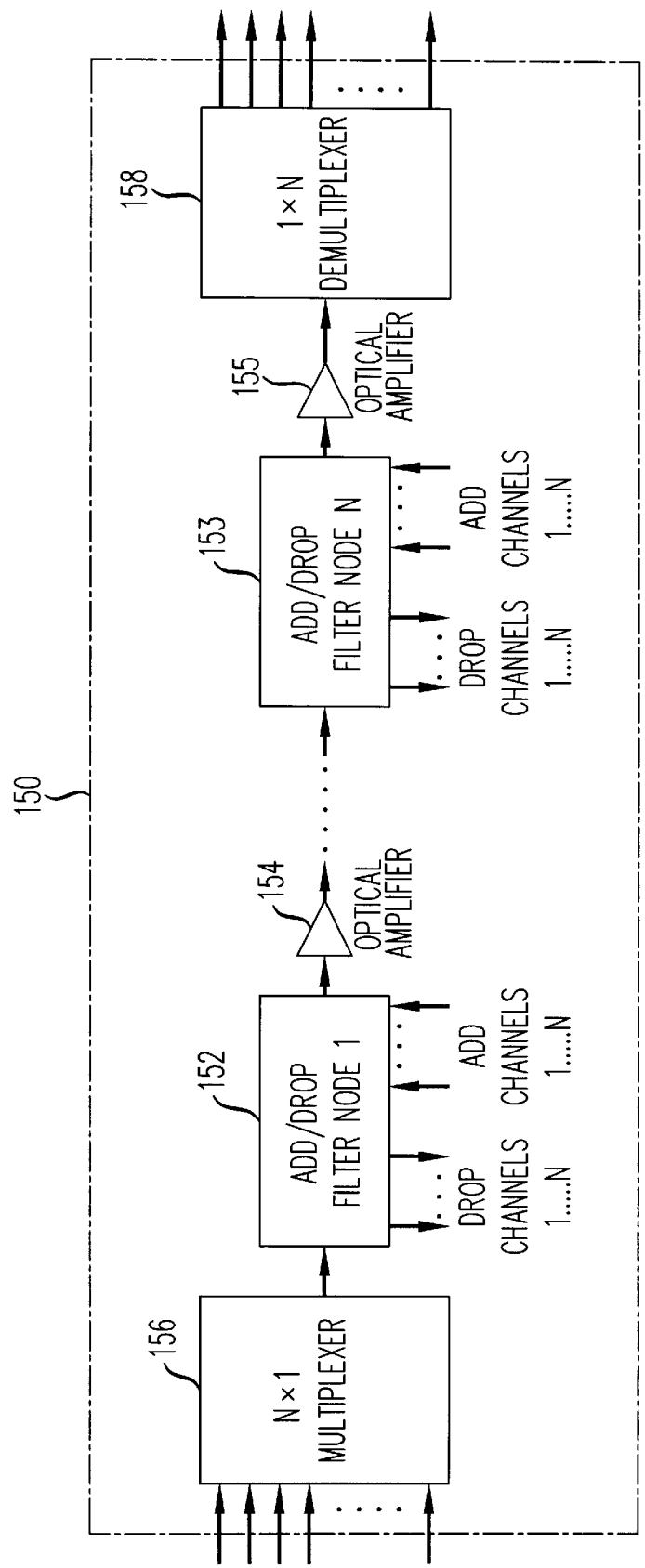
FIG. 3 shows a schematic diagram of a WDM add/drop capability in a long-haul optical network, comprising a number N of add/drop systems at nodes across the network.

In anticipated applications of this invention, a number of optical WDM add/drop systems are deployed at a number of nodes 152, 153 across a long-haul optical telecommunications system 150 (see FIG. 3). The system at each node 152, 153 is comprised of a series of switched filter-bypass devices. Optical signals in a plurality of optical channels enter the long-haul system 150, and are combined at multiplexer 156 to form a WDM signal. This signal is transported to nodes 152, 153. Upon exiting each node, these signals may be regenerated by optical amplifiers 154, 155. The filter-bypass devices forming the add/drop systems at each node 152, 153 can be interconnected in a number of ways (two preferred embodiments are illustrated in FIGS. 4(a) and 4(b)).

Figure 4A:
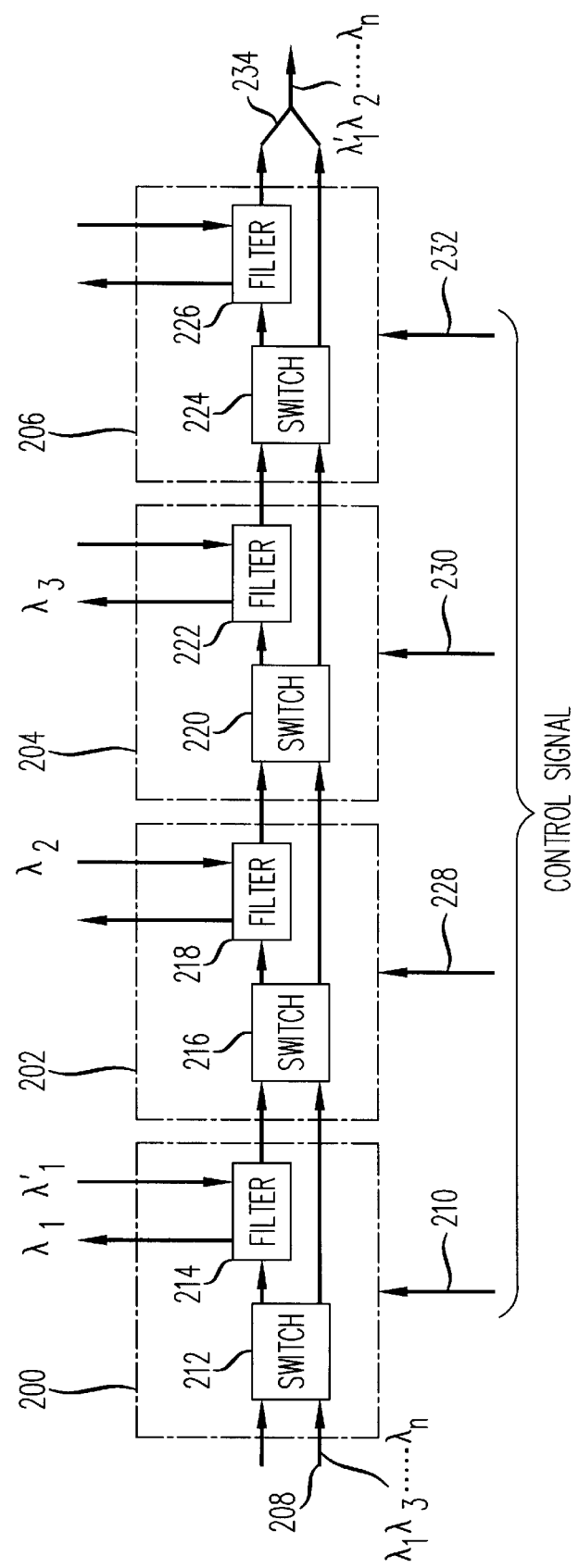
FIGS. 4(a) and 4(b) show schematic diagrams for two series of switched filter-bypass devices in accordance with the present invention.
Figure 4B:
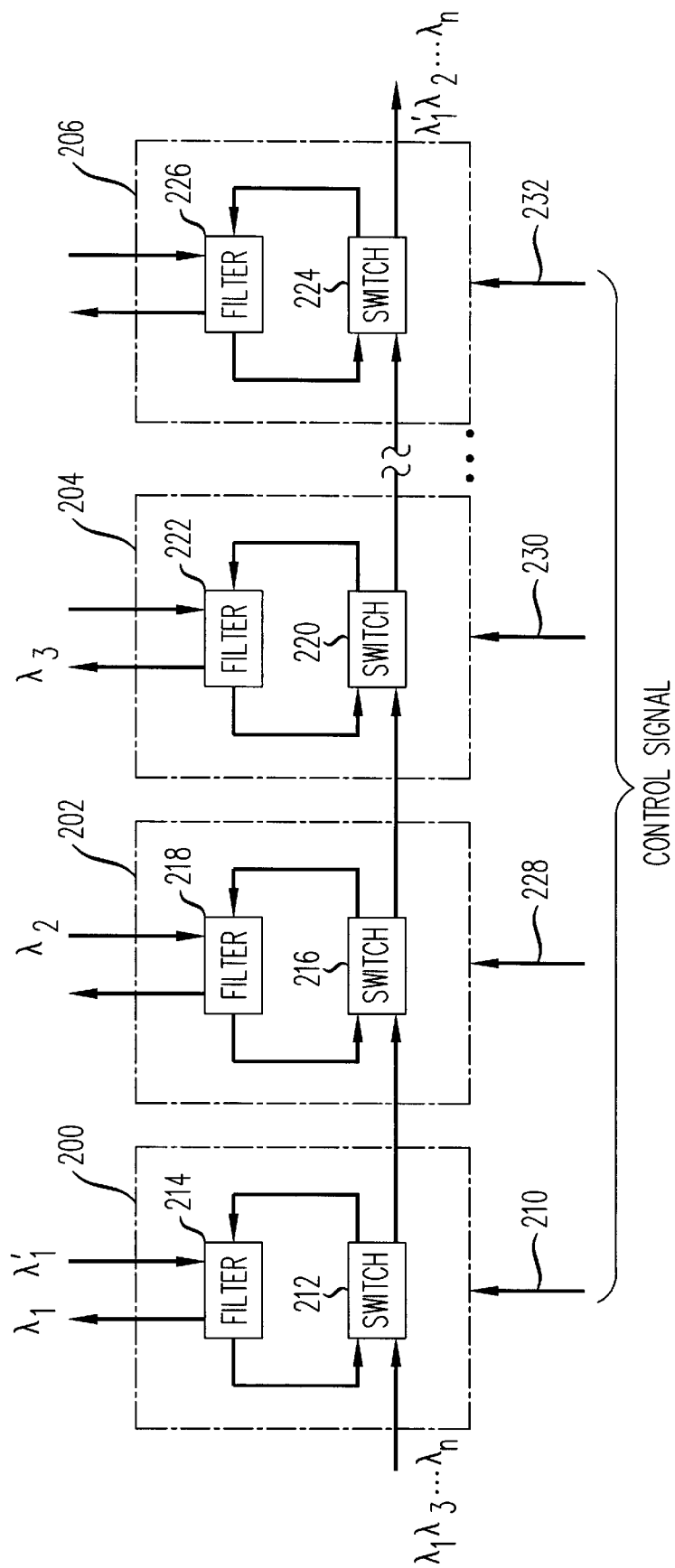

In FIG. 4(a), consisting of filter-bypass devices 200–206 the optical multiplexed frequency channel signal $\lambda_1 \lambda_3 \ldots \lambda_n$ is directed to the add/drop node input 208 of bypass-filter device 200. Responsive to the control signal 210, the switch 212 is switched into a filter state and the optical multiplexed frequency signal $\lambda_1 \lambda_3 \ldots \lambda_n$ is processed by the filter 214.

In this embodiment, the control signals 210, 228, 230, 232, operate in a coordinated manner. Specifically, for example, the control signal used to select the configuration of switch 216 in device 202 is determined based both on the desired state for device 202 (filter or bypass) and on the current state of the previous device 200 as established by switch 212. This latter element is important to the configuration of switch 216, because it determines which of two inputs to switch 216 will receive the WDM signal from previous device 200.

Consequently, the switch position of a bypass state and filter state may not be the same in each of the filter-bypass devices 200–206. Moreover, filter-bypass device 206 may advantageously be coupled to a two by one (2×1) switch or a Y-branch wave-guide combiner 234 to provide a single output of the set of filter-bypass devices 200–206.

The filter 214 of FIG. 4a, drops the frequency channel $\lambda_1$ and replaces it with the frequency channel $\lambda_1'$ to produce the multiplexed frequency signal $\lambda_1' \lambda_3 \ldots \lambda_n$. Thereafter, the optical multiplexed frequency signal $\lambda_1' \lambda_2 \lambda_3 \ldots \lambda_n$ is directed to the bypass-filter device 202, in which a similar process is repeated. However, in the present example illustrated by FIG. 4(a), the filter 218 adds a frequency channel $\lambda_2$ absent from the input signal, and a multiplexed frequency signal $\lambda_1' \lambda_2 \lambda_3 \ldots \lambda_n$ is produced. The multiplexed frequency signal $\lambda_1' \lambda_2 \lambda_3 \ldots \lambda_n$ is then directed to the bypass-filter device 204 in which a similar process is repeated. However, in the example of FIG. 4(a), the filter 222 drops the frequency channel $\lambda_3$ and a multiplexed frequency signal $\lambda_1' \lambda_2 \ldots \lambda_n$ is produced. This process is similarly repeated through remaining filter-bypass devices 206.

FIG. 4(b) shows an alternate node configuration, consistent with the device embodiment illustrated in FIGS. 1(a) and 1(b). The operation of this configuration is similar to that of the configuration in FIG. 4(a), with the exception of the routing of the filter outputs. In FIG. 4(b), the signal $\lambda_1'$ $\lambda_3 \ldots \lambda_n$ produced by the filter 214 is not directly routed to the switch 216, but is instead routed to a second input of the switch 208, which then routes this signal on to the switch 216. This process is repeated through the filter-bypass devices 206, and has the advantage of limiting the switch in each filter-bypass device to one external input and one external output. This limitation simplifies the process of determining the appropriate switch configuration for signal routing between filter-bypass devices, and thereby the appropriate control signals 210, 228, 230 and 232.

Wavelength-selective optical WDM add/drop systems can eliminate the bandwidth narrowing problems of the paired demultiplexer/multiplexer combination. Based on current bandwidth requirements for channel detection in WDM systems, bandwidth narrowing currently limits the number of paired Dragone demultiplexer/multiplexer add/drop nodes that can be inserted into a long-haul system to about ten nodes. Because bandwidth narrowing in wavelength-selective systems such as the present filter-bypass device configuration is negligible, the number of filter-bypass device based nodes that can be inserted into a long-haul optical system is effectively unlimited by bandwidth narrowing effects.

Although also benefiting from limited bandwidth narrowing effects, the fiber-grating based selective add/drop system experiences insertion losses that are uniformly higher than losses for the paired Dragone demultiplexer/multiplexer system and for the inventive filter-bypass device based system. Insertion losses for the inventive filter-bypass device based systems are generally lower than losses for the paired demultiplexer/multiplexer based systems, with loss performance for the filter-bypass system improving as the number of add/drop channels per node decreases. Based on current component element costs, the filter-bypass system is approximately one-half to one third as costly per node as the fiber-grating based selective add/drop system configuration, largely because the filter-bypass system configuration requires no optical circulators and fewer optical switches.

The exemplary embodiment of this method described above is but one of a number of alternative embodiments of the invention that will be apparent to those skilled in the art in view of the foregoing description. Accordingly, this description is to be construed as illustrative only, and is for the purpose of teaching those skilled in the art the best mode of carrying out the invention. Various other alternatives can be devised by a worker skilled in the art without departing from the teachings of this invention. For example, as previously mentioned, a variety of switch and/or combiner combinations can be employed to implement the switch function of the filter-bypass device. And a variety of thin film filter configurations, with varying numbers of ports allocated to add and drop channels, may be employed in the device as well.

We claim:

1. An optical wavelength division multiplexing add/drop system for an optical signal comprising a plurality of optical channels, the system comprising a bypass device comprising:
    an optical switch having first and second inputs and first and second outputs,
    an optical filter having at least one input and at least one output, the filter having a spectral characteristic related to at least one pre-selected channel in said plurality of channels,
    the first input of the optical switch switchably directing the optical signal to the filter or to a path bypassing the filter;
    the second input of the optical switch directing the optical signal to the path bypassing the filter; and
    the output of the optical filter directing the filter output to the second input of the optical switch.

2. The system of claim 1 wherein said optical filter further comprises an additional input for receiving optical signals associated with at least one additional optical channel related to the spectral characteristic of said filter, such that said signals are added to the optical signals associated with said remaining plurality of optical channels.

3. The system of claim 2, wherein said filter is a multi-port, thin-film filter.

4. The system of claim 1, wherein the switch is selected from the group consisting of a 2×2 optical switch and a 1×2 optical switch.

5. The system of claim 1, wherein said system comprises two or more filter-bypass devices that are serially interconnected.

6. The system of claim 5, wherein said interconnection comprises:
    a coupling between said other switch output in one device and said at least one switch input in an interconnected device; and
    a coupling between said other filter output in said one device and another switch input in said interconnected device.

7. The system of claim 6, wherein, in the final filter-bypass device in the sequence of said serially interconnected devices, said other switch output in said final device and said other filter output in said final device are coupled to the inputs of either a 2×1 optical switch or to the inputs of an optical Y-combiner.

8. The system of claim 5, wherein said interconnection comprises:
    a coupling between said other filter output in one device an additional switch input in the same device; and
    a coupling between said other switch output in said one device and said at least one switch input in said interconnected device.

9. A method for routing signals associated with a plurality of optical channels through a filter-bypass device in an Optical Waveguide Division Multiplexing Add/Drop system including an optical filter having an input, an output, and a spectral characteristic related to signals associated with at least one of said plurality of optical channels the method comprising the steps of:
    responding to a control signal to configure the filter-bypass device in a filter state or a bypass state;
    when said device is in said bypass state, routing said signals associated with said plurality of optical channels from a first switch input through said switch to a first switch output such that said signals bypass said optical filter; and
    when said device is in said filter state, routing said signals associated with said plurality of optical channels from said first switch input through said switch to a second switch output, from said second switch output to the optical filter input, from the said optical filter input through said filter to the filter output and from the filter output to the first switch input.

10. The method of claim 9, wherein said filter-bypass device is interconnected to an additional filter-bypass device, said method further including the steps of:
    when said device is in said bypass state, routing said signals associated with said plurality of optical channels from said switch output in said device to a switch input in said interconnected device; and when said device is in said filter state, routing said signals from said filter output to another switch input in said interconnected device.

11. The method of claim 9, wherein said filter-bypass device is interconnected to an additional filter-bypass device, said method further including the steps of:

when said device is in said bypass state, routing said signals associated with said plurality of optical channels from said switch output in said device to a switch input in said interconnected device;

when said device is in said filter state, routing said plurality of channels from said filter output in said device to another switch input in said device;

routing said plurality of channels from said other switch input in said device through said switch to said additional switch output in said device; and routing said plurality of channels from said additional switch output in said device to said first switch input in said interconnected device.

* * * * *